(12) United States Patent
Szalony

(10) Patent No.: US 6,581,740 B2
(45) Date of Patent: Jun. 24, 2003

(54) MULTIPLE DISC CLUTCH PACK HAVING RHEOLOGICAL FILM LAYER

(75) Inventor: Norman Szalony, Brighton, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/853,510

(22) Filed: May 11, 2001

(65) Prior Publication Data

US 2002/0166745 A1 Nov. 14, 2002

(51) Int. Cl.$^7$ .................. F16D 35/00; F16D 29/00
(52) U.S. Cl. .............. 192/21.5; 192/70.14; 192/107 R
(58) Field of Search ............... 192/21.5, 70.14, 192/113.36, 58.41, 107 R; 188/267.1, 267.2

(56) References Cited

U.S. PATENT DOCUMENTS

| | | | |
|---|---|---|---|
| 2,575,360 A | 11/1951 | Rabinow | 192/21.5 |
| 2,661,825 A | 12/1953 | Winslow | 192/21.5 |
| 2,886,151 A | 5/1959 | Winslow | 192/21.5 |
| 3,892,908 A | 7/1975 | Lovness | 428/329 |
| 4,982,808 A * | 1/1991 | Taureg et al. | 192/58.41 |
| 5,054,593 A | 10/1991 | Carlson | 192/21.5 |
| 5,094,328 A * | 3/1992 | Palmer | 192/21.5 |
| 5,398,917 A | 3/1995 | Carlson et al. | 267/140.14 |
| 5,645,752 A | 7/1997 | Weiss et al. | 252/62.54 |
| 5,670,213 A | 9/1997 | Blair | 427/318 |
| 5,779,013 A | 7/1998 | Bansbach | 192/21.5 |
| 5,823,309 A | 10/1998 | Gopalswamy et al. | 192/21.5 |
| 5,842,547 A * | 12/1998 | Carlson et al. | 192/21.5 |
| 5,845,752 A | 12/1998 | Gopalswamy et al. | 192/21.5 |
| 5,875,740 A * | 3/1999 | Ban et al. | 122/26 |
| 5,896,965 A * | 4/1999 | Gopalswamy et al. | 192/21.5 |
| 5,967,273 A | 10/1999 | Hampton | 192/21.5 |
| 5,985,168 A | 11/1999 | Phule | 252/62.52 |
| 5,988,336 A * | 11/1999 | Wendt et al. | 188/267.1 |
| 6,135,256 A * | 10/2000 | Han et al. | 192/113.36 |
| 6,173,823 B1 * | 1/2001 | Moser et al. | 192/21.5 |
| 6,412,618 B1 * | 7/2002 | Stretch et al. | 192/21.5 |

FOREIGN PATENT DOCUMENTS

| | | |
|---|---|---|
| EP | 1219849 A2 | 7/2002 |
| EP | 1219852 A1 | 7/2002 |
| GB | 2027365 A | 2/1980 |
| SU | 1772481 A | 10/1992 |
| WO | WO 99/22162 A1 * | 5/1999 |

OTHER PUBLICATIONS

Search report in a corresponding British patent application No. 0207867.3 from The Patent Office in Great Britain dated Sep. 25, 2002, 4 pages.

Search report in a corresponding British patent application No. 0207866.5 from The Patent Office in Great Britain dated Jul. 23, 2002, 4 pages.

Rabinow, J., "The Magnetic Fluid Clutch," vol. 67, No. Part 2, 1948, pp. 1308–1315.

Search report in a corresponding European Application No. 01310750.3 from European Patent Office dated Apr. 15, 2002, 5 pages.

Article entitled, "Magnetorheological Fluids: Materials, Characterization, and Devices," by Osama Ashour and Craig A. Rogers, 1996, pp. 123–130.

(List continued on next page.)

*Primary Examiner*—Rodney H. Bonck
(74) *Attorney, Agent, or Firm*—Brinks Hofer Gilson & Lione

(57) ABSTRACT

A multiple-disc clutch pack. The clutch pack comprises a plurality of porous metal plates mounted concentrically and each having a first and a second surface with at least one of the surfaces impregnated with a magneto-rheological substance. A plurality of grooves is defined on at least one of the surfaces of at least one of the plates.

23 Claims, 3 Drawing Sheets

OTHER PUBLICATIONS

Article entitled, "Brakes and Clutches Using ER Fluids," by Chris A. Papadopoulos, Apr. 15, 1998, pp. 719–726.

Article entitled, "Compensator–Based Position Control of an Electrorheological Actuator," by Z. B. Dlodlo and D. J. Brookfield, 1999, pp. 895–917.

Article entitled, "Magnetorheological Fluid Based Torque Transmission Clutches," by Melek Yalcintas, 1999, pp. 563–569.

Article entitled, "Design Analysis and Experimental Evaluation of an MR Fluid Clutch," by Usob Lee, Dohyun Kim, Nahmkeon Hur and Doyoung Jeon, 2000, pp. 701–707.

Copy of claims for co–pending U.S. application Ser. No. 09/752,420, filed on Dec. 29, 2000.

Copy of claims for co–pending U.S. application Ser. No. 09/752,051, filed on Dec. 29, 2000.

Copy of claims for co–pending U.S. application Ser. No. 09/853,817, entitled Method for Manufacturing Magneto–Rheological or Electro–Rheological Substance—Impregnated Materials, filed on May 11, 2001, attorney docket No. 10541/225.

* cited by examiner

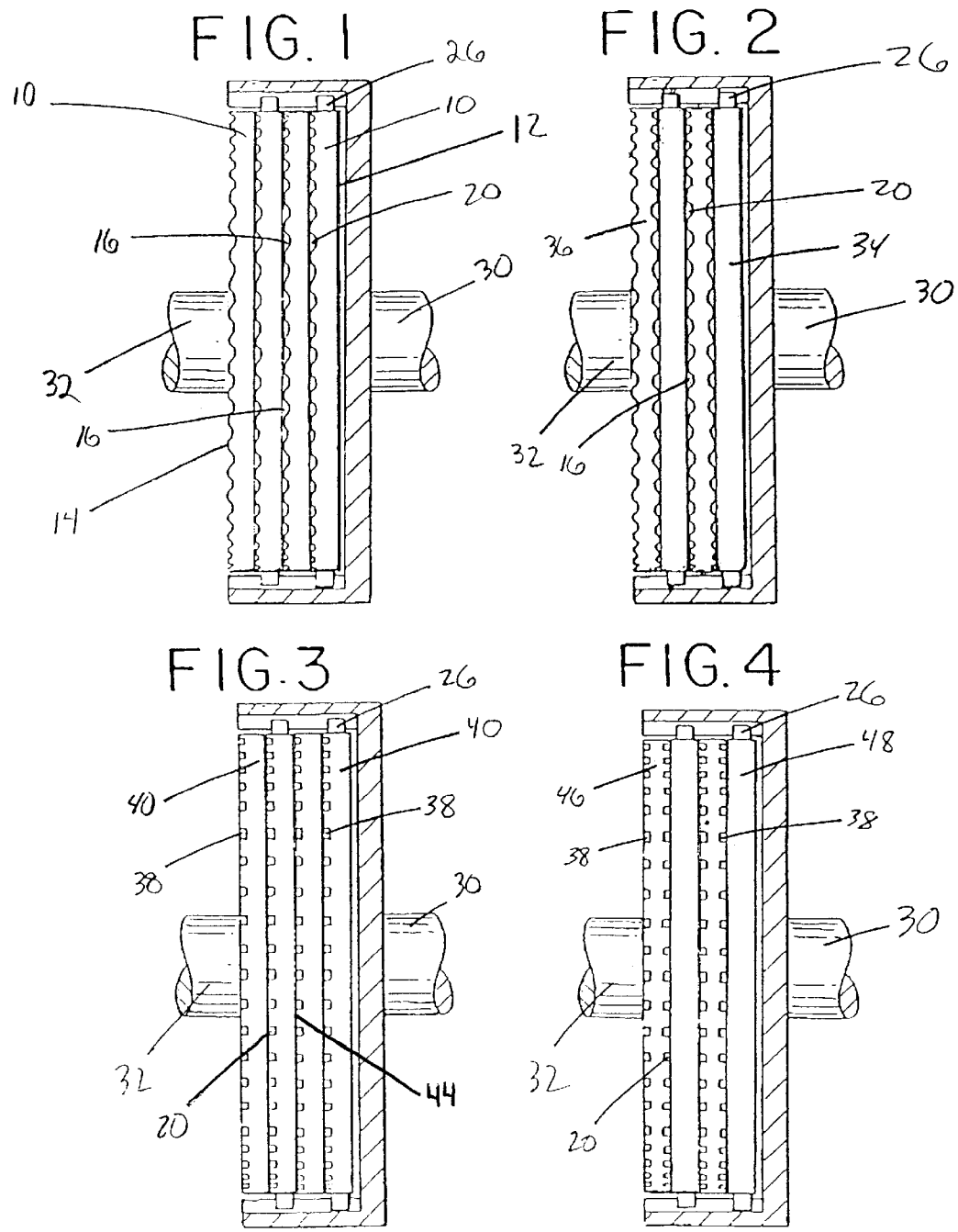

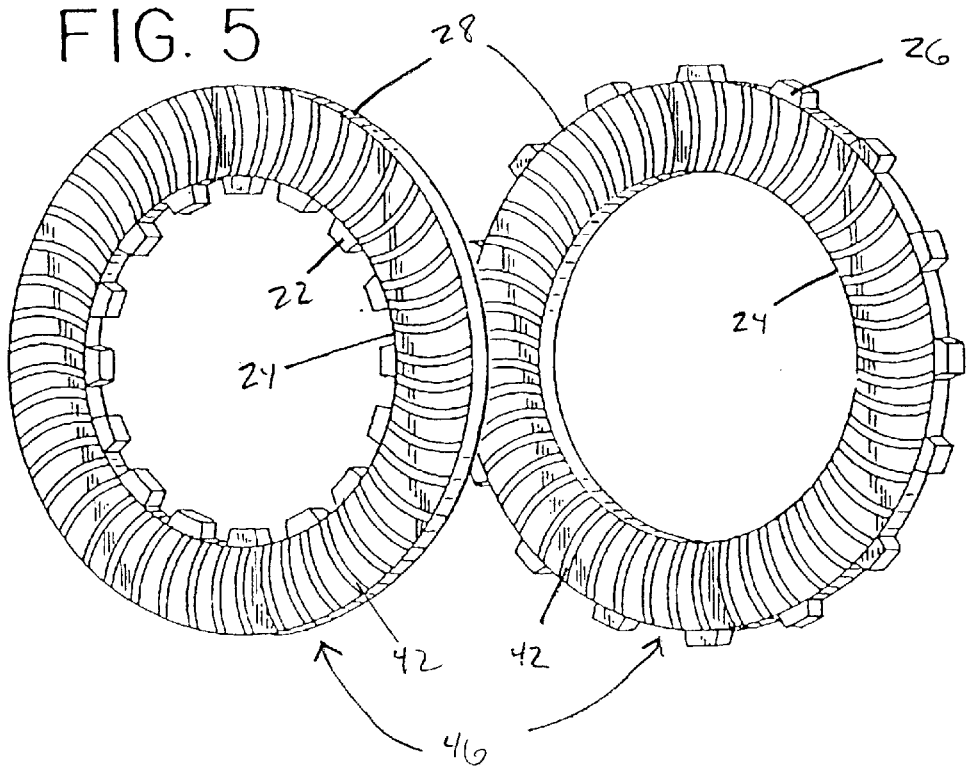
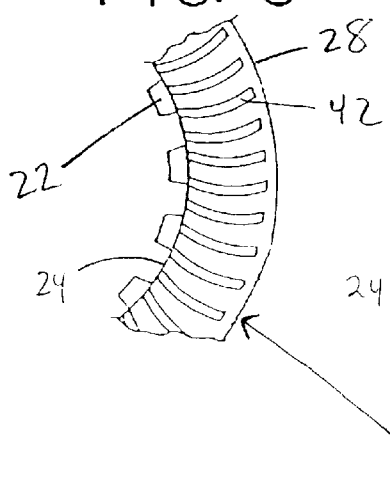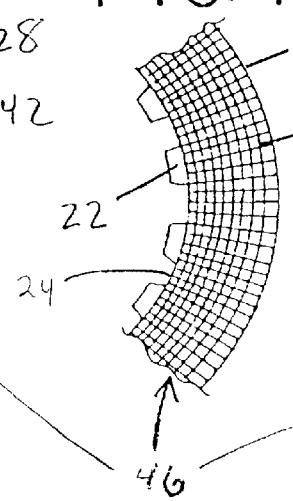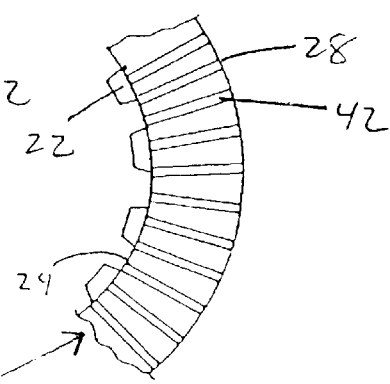

MULTIPLE DISC CLUTCH PACK HAVING RHEOLOGICAL FILM LAYER

FIELD OF THE INVENTION

The invention relates generally to the field of multiple-disc clutch packs, specifically clutch packs utilizing Magneto-rheological (MR) and Electro-Rheological (ER) substances.

DESCRIPTION OF THE RELATED ART

ER and MR fluids and powders are substances that rely on a magnetic capable media compounded in a way that allows the substance to change form from a liquid or powder state to a rigid, solid state. These materials comprise micron-sized, magnetizable particles called fines, suspended in oil or other media. ER and MR powders consist solely of unsuspended magnetizable particles.

ER and MR fluids are similar in their operation. The main difference is that ER fluids are responsive to an electric field and MR fluids are reactive to a magnetic field. However, MR fluids do have some advantages over ER fluids.

In their liquid form, ER and MR fluids have a viscosity and consistency much like common motor oil. However, when an electric charge or magnetic field is applied, the fluids change form, becoming rigid and able to bond surfaces together. This rigid bonding mechanism results from a dipole moment introduced on the magnetic particles in the fluid from the electric charge or magnetic field. The particles form chains, aligning parallel to the electric charge or magnetic field. The strength of the bonding mechanism depends on the strength of the charge or field applied to the fluid and the size of the particles. The change in viscosity of the fluid takes place in a few milliseconds. ER and MR powders operate in the same manner, changing from a powder to a rigid form. MR fluids typically exhibit much stronger yield strengths than do ER fluids. MR fluids are also more resistant to temperature changes and have a high tolerance to impurities such as water. MR fluids can also be activated using a much lower voltage power supply. ER fluids require high voltage (near 5,000 volts) to operate. For purposes of the present disclosure, discussion herein of the terms "ER and/or MR fluids" is also meant to refer to equivalent ER or MR substances, such as powders.

ER and MR fluids have been examined in the past as a way to "lock up" or stop a rotating device such as clutch plates. U.S. Pat. No. 2,575,360 describes such an application. The binding properties of the ER or MR fluid could increase the friction between two clutch plates quickly and easily, without having to actually change the axial displacement of the clutch plates. Instead of pressing the clutch plates against each other to bind them together, the ER or MR fluid could simply be activated and the solid form would bind the plates together.

A problem with using ER and MR fluids in this manner is that the fluid disperses during operation of the clutch due to centrifugation of the fluid outwardly and the random non-uniform gap thickness that can exist with flat surface disc clutch plates. When the fluid disperses, the binding properties of the fluid decrease and the clutch will lose its functionality. To solve this problem, it is necessary to replenish the fluid between the clutch plates. Pumping more fluid into the area between the clutch plates though holes in the adjoining shaft can accomplish this, but the plates must be moved apart in order to replenish the layer of fluid between them. This also necessitates a constant high energy power supply on the clutch mechanism to pump the fluid layer between the plates. It is desirable to keep a small volume of the fluid layer in place at all times, with the assistance of a residual low energy power supply, so that operation can be instantaneous, rather than having to replenish the fluid layer to maintain the functionality of the clutch pack. Or, in the alternative, it is desirable to have a mechanism to replenish the fluid layer without axially moving the plates.

BRIEF SUMMARY OF THE INVENTION

In one embodiment of the present invention, a multiple-disc clutch pack is provided. The clutch pack comprises a plurality of porous metal plates mounted concentrically and each having a first and a second surface with at least one of the surfaces impregnated with a magneto-rheological substance. A plurality of grooves is defined on at least one of the surfaces of at least one of the plates.

In a second embodiment of the present invention, a multiple-disc clutch pack is provided. The clutch pack comprises a plurality of porous metal plates mounted concentrically and each having a first and a second surface with at least one of the surfaces impregnated with an electro-rheological substance. A plurality of grooves is defined on at least one of the surfaces of at least one of the plates.

In a third embodiment of the present invention, a multiple-disc clutch pack is provided. The clutch pack comprises at least one first porous metal plate having at least one substantially flat surface and at least one surface impregnated with a magneto-rheological substance. The invention further comprises at least one second porous metal plate having at least one waved surface and at least one surface impregnated with a magneto-rheological substance. The first and second plates are mounted concentrically such that the flat surface of the first plate faces the waved surface of the second plate.

In a fourth embodiment of the present invention, a multiple-disc clutch pack is provided. The clutch pack comprises at least one first porous metal plate having at least one substantially flat surface and at least one surface impregnated with an electro-rheological substance. The invention further comprises at least one second porous metal plate having at least one waved surface and at least one surface impregnated with a magneto-rheological substance. The first and second plates are mounted concentrically such that the flat surface of the first plate faces the waved surface of the second plate.

In a fifth embodiment of the present invention, a method for improving the functionality of a magneto-rheological substance in a multiple-disc clutch pack is provided comprising the steps of providing at least one first porous metal plate, providing at least one second porous metal plate and defining a plurality of grooves in at least one side of each metal plate. The method further comprises the steps of impregnating at least one side of each plate with a magneto-rheological substance and arranging the plates concentrically such that each grooved side of each plate faces non-grooved side of an adjacent plate.

In a sixth embodiment of the present invention, a method for improving the functionality of a magneto-rheological substance in a multiple-disc clutch pack is provided comprising the steps of providing at least one first porous metal plate with at least one substantially flat surface and impregnating the flat surface with a magneto-rheological substance. The method further comprises the steps of providing at least one second porous metal plate with at least one waved surface and impregnating the waved surface with a magnetorheological substance and arranging the first and second plates concentrically such that each flat surface of each first plate faces a waved surface of a second plate.

In a seventh embodiment of the present invention, a method for improving the functionality of an electro-rheological substance in a multiple-disc clutch pack is provided comprising the steps of providing at least one first porous metal plate, providing at least one second porous metal plate and defining a plurality of grooves in at least one side of each metal plate. The method further comprises the steps of impregnating at least one side of each plate with an electro-rheological substance and arranging the plates concentrically such that each grooved side of each plate faces a non-grooved side of an adjacent plate.

In an eighth embodiment of the present invention, a method for improving the functionality of an electro-rheological substance in a multiple-disc clutch pack is provided comprising the steps of providing at least one first porous metal plate with at least one substantially flat surface and impregnating the flat surface with an electro-rheological substance. The method further comprises the steps of providing at least one second porous metal plate with at least one waved surface and impregnating the waved surface with an electro-rheological substance and arranging the first and second plates concentrically such that each flat surface of each first plate faces a waved surface of a second plate.

BRIEF DESCRIPTION OF SEVERAL VIEWS OF THE DRAWINGS

FIG. 1 is a side view of an embodiment of the present invention utilizing plates with both waved and flat surfaces;

FIG. 2 is a side view of an embodiment of the present invention utilizing plates with either waved surfaces or flat surfaces;

FIG. 3 is a side view of an embodiment of the present invention utilizing plates with both grooved and flat surfaces;

FIG. 4 is a side view of an embodiment of the present invention utilizing plates with either grooved or flat surfaces;

FIG. 5 is a perspective view of the grooved surface of two plates of an embodiment of the present invention;

FIG. 6 is a perspective view of an alternate pattern of grooving of a plate from FIG. 5;

FIG. 7 is a perspective view of an alternate pattern of grooving of a plate from FIG. 5;

FIG. 8 is a perspective view of an alternate pattern of grooving of a plate from FIG. 5;

DETAILED DESCRIPTION OF THE PREFERRED EMBODIMENTS OF THE INVENTION

Figure 9:
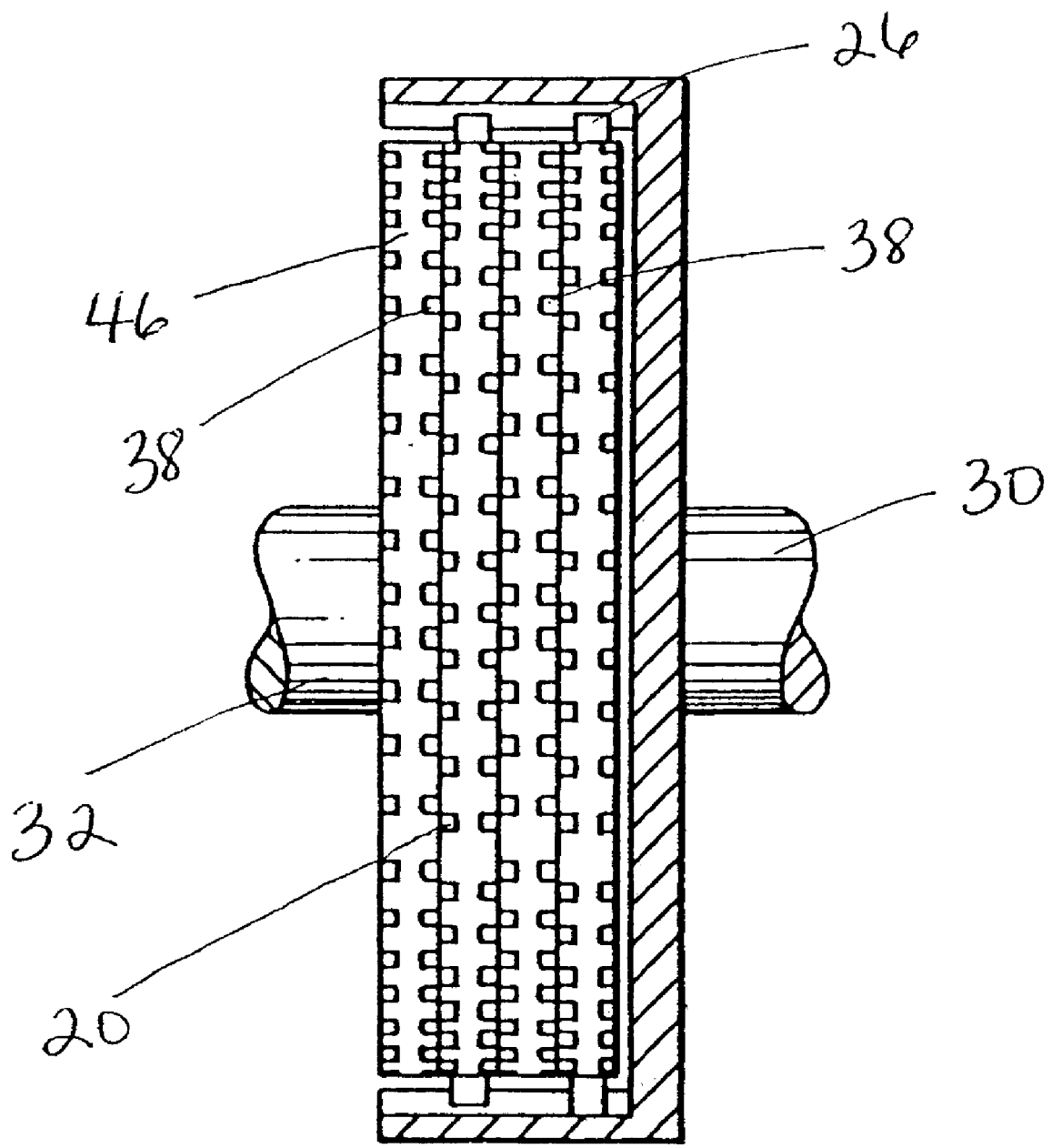
FIG. 9 is a side view of an embodiment of the present invention utilizing plates with grooved surfaces facing other plates with grooved surfaces.

Referring to FIG. 1, a preferred embodiment of the present invention is shown. A multiple-disc clutch pack is formed from disc-shaped plates 10 each having a first side 12 and a second side 14. The plates 10 are preferably formed from a porous metal, such as powder metal. In the embodiment shown in FIG. 1, the first side 12 of each plate 10 has a substantially flat surface. The second side 14 of each plate 10 has a substantially radially waved surface. The waves creating the substantially waved surface have smooth wave peaks that extend continuously from the smooth valleys of the waves. The waviness of the second side 14 of each plate 10 is just enough to create gaps 16 between the plates 10 when they are arranged with their surfaces 12, 14 touching as shown in FIGS. 1 and 2.

The surfaces 12, 14 of each plate 10 are impregnated with ER or MR fluid. One exemplary method of impregnating materials with ER or MR fluid is described in detail in U.S. patent application Ser. No. 09/752,420, entitled METHOD FOR UTILIZING AN ELECTRO-RHEOLOGICAL OR MAGNETO-RHEOLOGICAL SUBSTANCE IN MECHANICAL COMPONENTS, filed on Dec. 29, 2000 and U.S. patent application Ser. No. 09/853,817, now U.S. Pat. No. 6,428,860, entitled METHOD FOR MANUFACTURING MAGNETO-RHEOLOGICAL OR ELECTRO-RHEOLOGICAL SUBSTANCE-IMPREGNATED MATERIALS, filed on May 11, 2001, attorney docket number 10541/225, both of which have the same inventor herein and are commonly assigned to the same assignee herein. The details of these applications are herein incorporated by reference. Other methods of impregnation may be known to those skilled in the art. In the cited methods, a porous metal component, preferably formed from powder metal, is impregnated utilizing an electromagnet. The electromagnet is positioned on a side of the porous component and the ER or MR fluid is positioned on the side of the porous component opposite the electromagnet. Power is supplied to the electromagnet, and the magnetic field created by the electromagnet pulls the ER or MR fluid into the porous component.

The type of substance impregnated in the surfaces of each plate 10 depends on the amount of binding power needed. Higher binding power at a lower power level can be achieved through the use of an MR fluid. In situations where a lower binding strength is desired, or where power to activate the binding mechanism of the ER or MR fluid is not a concern, either an ER or MR fluid could be used.

A layer 20 of ER or MR fluid is preferably provided between the plates 10. The plates 10 are arranged concentrically such that each flat side 12 of a plate 10 faces a waved side 14 of another plate 10. The plates 10 also alternate between having internally projecting splines 22 extending from the inner diameter 24 or externally projecting splines 26 extending from the outer diameter 28 as shown in FIG. 5. These splines 22, 26 connect each plate 10 to the input shaft 30 or the output shaft 32 to provide power transfer.

The layer 20 of ER or MR fluid provides a mechanism to bind the plates 10 together and transfer power from the input shaft 30 to the output shaft 32. If ER fluid is used for the layer 20 and the impregnated surfaces, an electric charge is applied to the layer 20 and the plates 10. This charge causes the ER fluid to solidify and interact with the ER fluid impregnated in the surfaces 12, 14 of the plates 10, binding the plates 10 connected to the input shaft 30 to the plates 10 connected to the output shaft 32 and transferring power from the input shaft 30 to the output shaft 32. If an MR fluid is used, a magnetic field should be applied to the layer 20 and the plates 10 to get the same result. The impregnated surfaces 12, 14 of the plates 10 are in constant contact with each other, and the binding effect of the ER or MR fluid provides for the power transfer.

The waved surfaces 14 of the plates 10 provide an open pathway for the layer 20 of ER or MR fluid to be replenished between the plates 10. This allows for instant on/off capacity, as there is always at least a small layer 20 of ER or MR fluid between the plates to interact with the ER or MR fluid impregnated in the plates 10. A minimal residual power supply may also be used to help maintain the layer 20 of ER or MR fluid between the plates 10. An exemplary method for utilizing a minimal residual power supply in this manner is described in detail in U.S. patent application Ser. No. 09/752,051 entitled METHOD TO USE A MAGNETO-RHEOLOGICAL OR ELECTRO-RHEOLOGICAL SUBSTANCE BY USING A CONTINUOUS MINIMAL LOW THRESHOLD POWER SUPPLY, filed on Dec. 29, 2000, having the same inventor herein and commonly assigned to the same assignee herein, and herein incorporated by reference. The magnitude of the power supply threshold must be sufficient to provide a minimal layer 20 to exist on facing plate 10 surfaces, but low enough to allow relative rotation between plates 10 without any appreciable drag torque or holding torque capacity. The objective of the minimal residual power supply is to counteract the centrifugation phenomena of the ER or MR fluid layer 20 between the facing plates 10. The need for constantly pumping a layer 20 of the ER or MR fluid between the plates 10 is eliminated. The need to axially move the plates 10 apart to replenish the layer 20 is also eliminated. The layer 20 of fluid may be replenished by immersing the plates 10 as they rotate in ER or MR fluid present in the clutch pack, as oil is present in a prior art clutch pack.

Referring to FIG. 2, an alternate embodiment of the invention is shown utilizing first plates 34 and second plates 36. In this embodiment, each first plate 34 is preferably flat on both surfaces. Preferably, each second plate 36 is waved on both surfaces. As in the embodiment shown in FIG. 1, the first 34 and second 36 plates are arranged such that each flat surface 12 faces a waved surface 14, by alternating between first 34 and second 36 plates. The connections to the input 30 and output 32 shafts are similar to the embodiment shown in FIG. 1, with every other plate 34, 36 connected to the input shaft 30, and the remaining plates 34, 36 connected to the output shaft 32.

Referring to FIG. 3, another alternate embodiment of the present invention is shown. In this embodiment, a pattern of grooves 38, also shown in FIG. 5, is defined on at least one surface of each plate 40. The surfaces of each plate 40 are impregnated with ER or MR fluid. The plates 40 are preferably arranged such that each grooved surface 42 faces a flat surface 44, and the plates 40 are connected to the input 30 and output 32 shafts as described in the previous embodiments.

Referring to FIG. 9, another alternate embodiment of the present invention is shown. In this embodiment, a pattern of grooves 38, also shown in FIG. 5, is defined on at least one surface of each plate 46. The surfaces of each plate 46 are impregnated with ER or MR fluid. The plates 46 are preferably arranged such that each grooved surface 42 faces another grooved surface 42, and the plates 46 are connected to the input 30 and output 32 shafts as described in the previous embodiments.

FIGS. 5–8 show preferred embodiments of the plurality of grooves forming a grooved pattern used in the embodiments shown in FIGS. 3 and 4. However, it should be recognized that any grooving pattern could be used on the plates 40. The inner 22 and outer 26 splines used to connect the plates 10, 34, 36, 40, 46, 48 to the input 30 and output shafts 32 are also shown in FIGS. 5–8. In the embodiment shown in FIG. 5, the grooves 42 are arranged in a spiral pattern. The grooves 42 arranged to form a spiral pattern have a curvature giving them a concave shape as shown in FIGS. 5 and 6. Each groove 42 begins at the inner diameter 24 of the plate 46 and continues to the outer diameter 28 of the plate 40, 46.

The grooves 42 can be any depth, and they preferably create an open path from the inner diameter 24 to the outer diameter 28 of each plate 40, 46. This path allows ER or MR fluid to freely travel across the surface of the plates 40, 46, 48, regardless of how close together the plates 40, 46, 48 are to each other.

In the embodiment shown in FIG. 6, the grooves 42 are once again arranged in a spiral pattern. However, in this embodiment, the grooves 42 preferably are not open to the outer diameter 28 of the plates 40, 46. The grooves begin at the inner diameter 24 of each plate 40, 46, but end between the inner 24 and outer 28 diameters. This embodiment still allows a substantial layer 20 of ER or MR fluid to remain between the plates 46, 48 at all times, without having to move the plates 46, 48 apart.

FIGS. 7 and 8 show two more examples of possible grooving patterns for use in embodiments of the present invention. FIG. 7 shows an embodiment utilizing a cross-hatched pattern of grooves 42. FIG. 8 shows a radial pattern of grooves 42. In all embodiments of the grooving patterns, the grooves 42 can be any depth and can either be open to the inner 24 and outer 28 diameters or closed.

It should be noted that there could be a wide range of changes to the claimed method. Any type of grooved pattern could be used on the plates 46, 48, and the depth and size of the grooves 42 can be varied in any way. Waved plates 36 could be combined with grooved plates 46 in the same multi-disc clutch pack. The surfaces of each plate 10, 34, 36, 40, 46, 48 could be impregnated with an ER or MR fluid or an ER or MR powder. Rather than constant immersion in an ER or MR fluid present in the clutch pack, the ER or MR fluid could be pumped into the gaps between the plates 10, 34, 36, 40, 46, 48 when needed. Thus, it is intended that the foregoing detailed description be regarded as illustrative rather than limiting and that it be understood that it is the following claims, including all equivalents, which are intended to define the scope of the invention.

What is claimed is:

1. A multiple-disc clutch pack comprising:

a plurality of porous metal plates mounted concentrically and each having a first surface and a second surface;

said plates each having at least one of said surfaces impregnated with a magneto-rheological substance; and a plurality of grooves defined on at least one of said surfaces of at least one of said plates, wherein said grooves form a spiral, radial or crosshatched pattern, and said plurality of grooves forming said spiral pattern comprise a concave shape.

2. The multiple-disc clutch pack of claim 1, wherein said plates are arranged such that each of said grooved surfaces faces another grooved surface.

3. The multiple-disc clutch pack of claim 2, wherein plurality of said plates are internally splined and a plurality of said plates are externally splined.

4. The multiple-disc clutch pack of claim 3, wherein said internal splines extend from the inner diameter of said internally splined plates and said external splines extend from the outer diameter of said externally splined plates.

5. The multiple-disc clutch pack of claim 4, wherein the arrangement of plates is such that it alternates between said internally splined plates and said externally splined disc-shaped plates.

6. The multiple-disc clutch pack of claim 5, wherein said grooved surfaces allow a layer of magneto-rheological substance to remain between said plates at all times during operation of said multiple-disc clutch pack.

7. The multiple-disc clutch pack of claim 1, wherein said plates are arranged such that each of said grooved surfaces of said disc-shaped plates faces a flat surface on another disc-shaped plate.

8. The multiple-disc clutch pack of claim 1 wherein said grooves of said spiral groove pattern have a concave shape.

9. The multiple-disc clutch pack of claim 8 wherein said spiral groove pattern begins at an inner diameter and ends between said inner diameter and an outer diameter of said metal plate.

10. The multiple-disc clutch pack of claim 8 wherein said spiral groove pattern begins at said inner diameter and extends to said outer diameter of said metal plate.

11. A multiple-disc clutch pack comprising:
   a plurality of porous metal plates mounted concentrically and each having a first surface and a second surface;
   said plates each having at least one of said surfaces impregnated with an electro-rheological substance; and
   a plurality of grooves defined on at least one of said surfaces of at least one of said plates, wherein said grooves form a spiral, radial or crosshatched pattern, and said plurality of grooves forming said spiral pattern comprise a concave shape.

12. A multiple-disc clutch pack comprising:
   at least one first porous metal plate having at least one substantially flat surface and having at least one surface impregnated with a magneto-rheological substance;
   at least one second porous metal plate having at least one waved surface, said waved surface having smooth wave peaks and valleys, and having at least one surface impregnated with a magneto-rheological substance; and
   said first and second plates mounted concentrically such that said flat surface of said first plate faces said waved surface of said second plate.

13. The multiple-disc clutch pack of claim 12, wherein said first plate has a flat surface both on a first side and on a second side.

14. The multiple-disc clutch pack of claim 13, wherein said second plate has a waved surface both on a first side and on a second side.

15. The multiple-disc clutch pack of claim 14, wherein said plates are arranged such that said first plates alternate with said second plates.

16. The multiple-disc clutch pack of claim 15, wherein said flat sides of said first plates face said waved sides of said second plates.

17. The multiple-disc clutch pack of claim 12, wherein said plates each have a flat side and a waved side.

18. The multiple-disc clutch pack of claim 17, wherein said plates are arranged such that each flat side of said plates faces a waved side of another of said plates.

19. A multiple-disc clutch pack comprising:
   at least one first porous metal plate having at least one substantially flat surface and having at least one surface impregnated with an electro-rheological substance;
   at least one second porous metal plate having at least one waved surface, said waved surface having smooth wave peaks and valleys, and having at least one surface impregnated with an electro-rheological substance; and
   said first and second plates mounted concentrically such that said flat surface of said first plate faces said waved surface of said second plate.

20. A method for improving the functionality of a magneto-rheological substance in a multiple-disc clutch pack, said method comprising the steps of:
   providing at least one first porous metal plate;
   providing at least one second porous metal plate;
   defining a plurality of grooves in at least one side of each said first and each said second metal plate, wherein said grooves form a spiral, radial or crosshatched pattern, and said plurality of grooves forming said spiral pattern comprise a concave shape;
   impregnating at least one side of each said first and each said second metal plate with a magneto-rheological substance; and
   arranging said first and said second metal plates concentrically such that each grooved side of said plates faces a non-grooved side of an adjacent plate.

21. A method for improving the functionality of a magneto-rheological substance in a multiple-disc clutch pack, said method comprising the steps of:
   providing at least one first porous metal plate with at least one substantially flat surface and impregnating said surface with a magneto-rheological substance;
   providing at least one second porous metal plate with at least one waved surface, said waved surface having smooth wave peaks and valleys, and impregnating said surface with a magneto-rheological substance; and
   arranging said first and second metal plates concentrically such that each flat surface of said first plate faces said waved surface of said second plate.

22. A method for improving the functionality of an electro-rheological substance in a multiple-disc clutch pack, said method comprising the steps of:
   providing at least one first porous metal plate;
   providing at least one second porous metal plate;
   defining a plurality of grooves in at least one side of each said first and each said second metal plate, wherein said grooves form a spiral, radial or crosshatched pattern, and said plurality of grooves forming said spiral pattern comprise a concave shape;
   impregnating at least one side of each said first and each said second metal plate with an electro-rheological substance; and
   arranging said first and said second metal plates concentrically such that each grooved side of said plates faces a non-grooved side of an adjacent plate.

23. A method for improving the functionality of an electro-rheological substance in a multiple-disc clutch pack, said method comprising the steps of:
   providing at least one first porous metal plate with at least one substantially flat surface and impregnating said surface with an electro-rheological substance;
   providing at least one second porous metal plate with at least one waved surface, said waved surface having smooth wave peaks and valleys, and impregnating said surface with an electro-rheological substance; and
   arranging said first and said second metal plates concentrically such that each flat surface of said first plate faces said waved surface of said second plate.

* * * * *